No. 633,471. Patented Sept. 19, 1899.
E. McGARVEY.
WEIGHT AND PRESSURE INDICATOR.
(Application filed Apr. 14, 1898.)
(No Model.) 3 Sheets—Sheet 1.
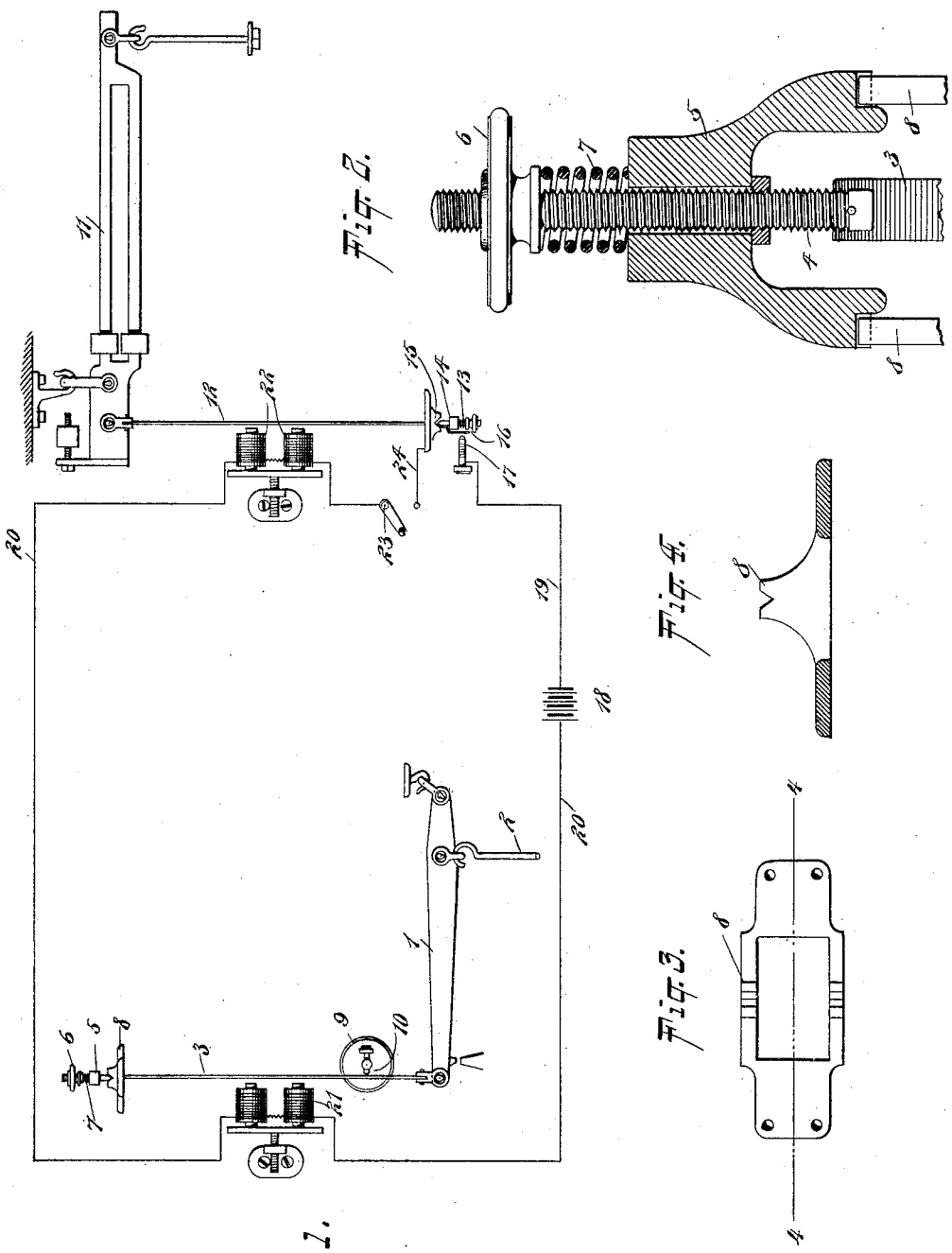

No. 633,471. Patented Sept. 19, 1899.
E. McGARVEY.
WEIGHT AND PRESSURE INDICATOR.
(Application filed Apr. 14, 1898.)
(No Model.) 3 Sheets—Sheet 2.
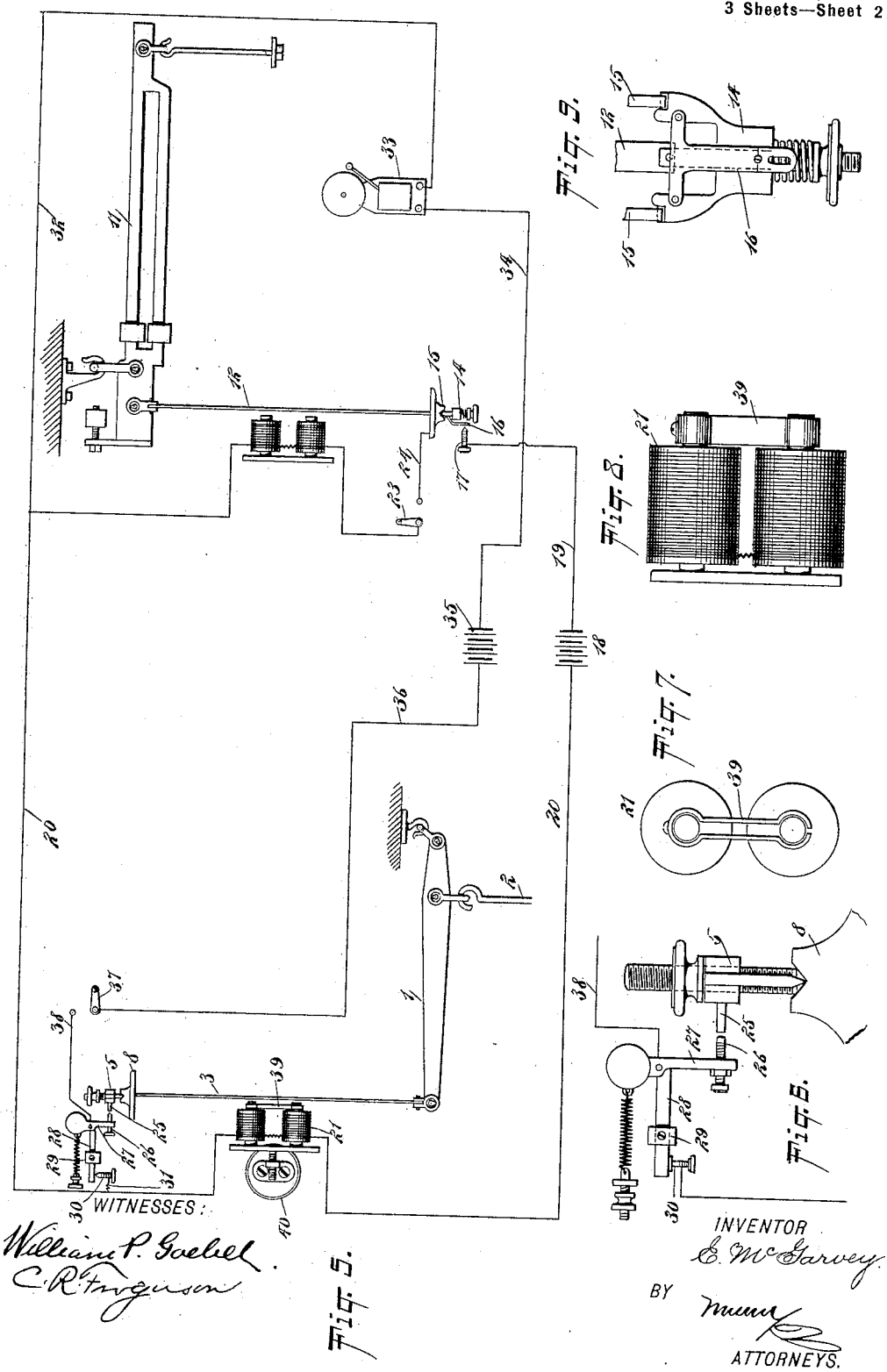
WITNESSES:
William P. Goebel
C. R. Ferguson
INVENTOR
E. McGarvey
BY
Munn
ATTORNEYS.

No. 633,471. Patented Sept. 19, 1899.
E. McGARVEY.
WEIGHT AND PRESSURE INDICATOR.
(Application filed Apr. 14, 1898.)
(No Model.) 3 Sheets—Sheet 3.
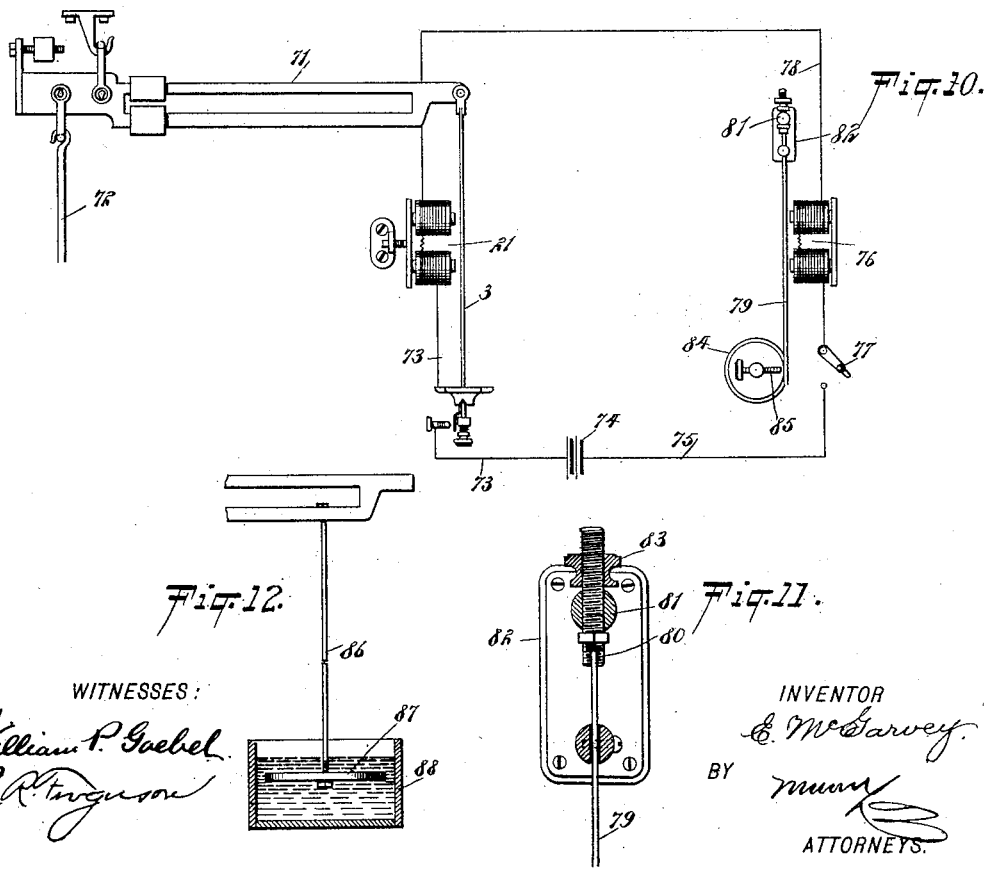
WITNESSES:
William P. Goebel
C. R. Ferguson
INVENTOR
E. McGarvey
BY
ATTORNEYS.

UNITED STATES PATENT OFFICE.

EDWARD McGARVEY, OF BELLEFONTE, PENNSYLVANIA, ASSIGNOR OF ONE-HALF TO GUY C. LINN, OF CLEVELAND, OHIO.

WEIGHT AND PRESSURE INDICATOR.

SPECIFICATION forming part of Letters Patent No. 633,471, dated September 19, 1899.

Application filed April 14, 1898. Serial No. 677,580. (No model.)

*To all whom it may concern:*

Be it known that I, EDWARD McGARVEY, of Bellefonte, in the county of Center and State of Pennsylvania, have invented a new and Improved Weight and Pressure Indicator, of which the following is a full, clear, and exact description.

This invention relates to an arrangement of apparatus for indicating at a certain point— such, for instance, as in an office—the weight and pressure exerted on the apparatus at a distant point.

By the laws of vibration a string or ribbon under tension will have a fundamental rate of vibratory motion varying in a certain ratio to the stretching force applied to it, and I have applied this principle as attached to scale-beams to indicate the weight and pressure of loads, and particularly adapted for use in connection with weighing coal on the scales in the yard at a distance from the office in which the weight is ascertained.

I will describe a weight and pressure indicator embodying my invention and then point out the novel features in the appended claims.

Reference is to be had to the accompanying drawings, forming a part of this specification, in which similar characters of reference indicate corresponding parts in all the views.

Figure 1 is a diagrammatic view of a weight and pressure indicator embodying my invention. Fig. 2 is a sectional elevation of a hanger employed. Fig. 3 is a plan view of a fulcrum-plate for the hanger. Fig. 4 is a section through the line 4 4 of Fig. 3. Fig. 5 is a diagrammatic view showing a modification in which an audible alarm is arranged. Fig. 6 shows a circuit-controller employed in this modification. Fig. 7 is an end view of an electromagnet employed in the modification shown in Fig. 5. Fig. 8 is a side view thereof. Fig. 9 is a side view of an interrupter employed. Fig. 10 is a diagrammatic view showing another modification. Fig. 11 shows a vibrator-suspending device in this last-named modification, and Fig. 12 shows a deadener that may be employed.

Referring to the example of my improvement shown in Fig. 1, 1 designates a scale-beam for the usual type of platform-scale located in a coal-yard, the beam being connected with the scale mechanism by the rod 2. Attached to the free end of the beam 1 is one end of a vibrating strip or ribbon 3 of suitable material—such, for instance, as steel. The upper end of the vibrating strip or ribbon is connected to a screw 4, extended loosely through a hanger 5 and having an adjusting-screw 6 on its outer screw-threaded end, and between this adjusting-screw 6 and the end of the hanger 5 is a spring 7. This spring 7 will relieve the ribbon 3 of the sudden shock when a load is moved onto the platform of the scale. The hanger 5 is mounted to rock on a fulcrum 8, attached to a fixed support. Arranged near the ribbon 3 is a sounding-box 9, having a screw-plug 10, adapted to be tapped by the ribbon, as will be hereinafter described. At the main office is the scale-beam 11, adapted to receive weights in the ordinary manner. To this scale-beam 11 one end of a vibrating strip or ribbon 12 is attached, the other end thereof being attached to a screw 13, extended through a hanger 14, fulcrumed to swing in a fixed fulcrum-plate 15, these parts being identical with the parts shown in Fig. 2, excepting that on the hanger 14 is attached a spring-plate 16, adapted to engage with a contact-point 17. From one pole of a source of electricity, here shown as a battery 18, a wire 19 leads to the contact-point 17, and from the other pole of this source of electricity a wire 20 leads through an electromagnet 21, arranged near the vibrating ribbon 3, and thence through an electromagnet 22, arranged near the vibrating strip or ribbon 12, and thence to a switch 23, designed to be engaged with a wire 24, connected to the fulcrum-plate 15.

In the operation of this device, when weight or pressure is applied to the beam 1 and the electric circuit is closed, by closing the switch 23 the ribbon 3 will be kept in constant vibration, as will also the ribbon 12 when the two ribbons are in unison. The vibration of the ribbon 12 as it moves toward the electromagnet will rock the hanger 14 in the opposite direction and break the contact of the spring 16 with the contact-point 17. As soon as the current is thus interrupted the ribbon will move in the opposite direction and cause the parts 16 and 17 to again close the circuit.

This pulsation keeps up as long as the current is turned on. By moving the weights along the beam 11 the tension of the ribbon 12 will be increased, and when the weights are moved to the right point to make the tension of the ribbon 12 equal to the tension of the ribbon 3, the two ribbons will vibrate in unison, or, in other words, they will both have the same fundamental rate. The vibration of the ribbon 3 will be made known by its striking against the screw 10 and producing a sound in the sounding-box, and this will give notice that the pressure on the two ribbons is equal.

In case where the office is at a considerable distance from the yard or where the weight is applied I employ an additional call-circuit and also means for making and breaking the call-circuit, the said means being governed by the ribbon 3. In this case the hanger 5 is provided with a tappet 25, adapted to strike against an adjustable screw 26 in a downwardly-extended arm 27 of the circuit-closing lever 28. This circuit-closing lever may be counterbalanced by any desired means, and it may be provided with an adjustable weight 29. The circuit-closing lever 28 is designed to make and break connection through a screw 30, having shunt connection 31 with the wire 20. From this wire 20 a shunt 32 extends to one pole of a magnet in the bell 33, arranged in the office, and from the other pole of this bell-magnet a wire 34 leads to a battery 35. From the other pole of this battery a wire 36 leads to a switch 37, designed to be engaged with a wire 38, connected with the circuit-closing lever. The operation of this device in its main features is the same as that first described. After closing the switch 37 the vibrations of the ribbon 3 will vibrate the hanger 5 and cause the tappet 25 to strike repeated blows against the screw 26, which of course will cause the arm 27 to move to and from the screw 30, making the contact imperfect. When this common circuit is used, the magnet 21 has around the ends of its poles a thin band 39, of soft iron, which is bent to closely conform to, but not actually touch, the poles. This band is open at one end and the magnet is placed on a sounding-box 40. This is a call which responds to the intermittent electric current through the interrupter 16 17 of the ribbon 12.

The whole operation of this example may be summed up as follows: Assuming the scale having the beam 1 to be at a coal-yard and the part having the beam 11 in an office five hundred feet away, but in plain sight, the driver having placed a load on the scale closes the switch 37, which starts the call in the distant office. The attendant then in the office closes the switch 23, thus starting the ribbon 12 in its vibration, and also the call or sounding device 40. This informs the driver that the load is being weighed. The switch 37 being closed the bell in the office continues to ring until the weighman or attendant has moved the poise on the beam 11 to the proper point, when the ribbon at the scale will vibrate. The tappet 25 will hammer against the screw 26, as before described, and the contact with the screw 30 will be broken and the bell in the office will stop ringing. It is found that as the poise nears the proper point on the beam 11 the bell 33 will ring the beats of the ribbon, but at the exact mark the bell will remain silent, thus indicating that the scale is balanced. The attendant then opens the switch 23, which silences the ribbon and the call in the box 40. The driver will then know that his load has been weighed, and he then opens the switch 37 and drives off the scale.

In Fig. 12, 71 indicates the beam of any scale subjected to pulling force through the rod 72. The ribbon 3 is attached at its upper end to the free end of said scale-beam and at its lower end to an interrupter, as before described. From the electromagnet 21, coacting with the ribbon 3, a wire 73 extends through the interrupter to one pole of a battery 74, and from the other pole of this battery a wire 75 leads to an electromagnet 76, and this wire 75 contains a switch 77. From the electromagnet 76 a wire 78 extends to the electromagnet 21. Coacting with the electromagnet 76 is a steel tongue or vibrator 79. The upper end of this vibrator 79 is connected to a screw 80, movable through a lug 81 on a fixed plate 82, and engaging with the screw 80 above the lug 81 is a thumb-screw 83. By this construction it is obvious that the vibrator may be adjusted vertically. Near the lower end of the vibrator 79 is a sounding-box 84, having a screw 85, with which the vibrator is designed to engage. In this example the fundamental rate of the vibrator or tongue 79 is just equal to the fundamental rate of the ribbon 3, and when the poises are at zero on the beam 71—that is, when the scale is without load—the tongue or vibrator 79 will vibrate. When a load is placed on the scale, the vibrator 79 will remain quiet until the poise on the beam 71 has been moved to the point where it just balances the load, when the ribbon 3 will have again its initial tension. Its rate of vibration will then equal that of the vibrator 79, which will in consequence be thrown into active vibration, and, striking the screw 85 on the sounding-board 84, will denote a balanced scale.

The device shown in Fig. 12 is simply a liquid deadener to be used in case the lever or other part of the scale is of such light character that it will take up a portion of the motion of the ribbon and by its reaction change the rate of the ribbon. To the rod 86, depending from the scale-beam, is affixed a disk 87, which more or less loosely fits in a vessel 88 containing a viscous fluid.

The advantages of this invention are various. The amount of pressure on the scale to which it is connected may be accurately determined at any desired distance from the scale over which it is possible to transmit an undulating current of electricity. The location of the weight-beam is not governed by the location of the scale, and vice versa. By the use of this invention it is possible to have the weighing of the loads on various scales done at one place or weighing-office. The weighing may be done both at the scale or at the distant point or points, and by the use of this invention in connection with a scale of the lever type there will be no perceptible motion of the lever, thus preventing practically all wear of scale-pivots and by so doing keeping the scale more sensitive and accurate than would be the case if this invention were not used. Another advantage is that the weight of an object on the scale may be determined without the use of movable weights on the scale-beam. It may be here stated that when the office is quite remote from the coal-yard or other place where the scale may be located a telephone-circuit may be provided.

It will be observed that the two electromagnets constitute electric operating mechanisms for imparting vibratory motion and that they are controlled in unison by the battery or other source of electricity. Furthermore, the contact-breaker or circuit-controller constitutes an appliance for periodically disturbing the action of said source of electricity to influence said operating mechanisms. Each of these operating mechanisms controls one of the vibratory devices, and the latter can be put under different strains or tensions, as described, it being understood that they will vibrate synchronously only when the condition of equilibrium has been reached by a proper adjustment of the tension at the receiving-station.

Having thus described my invention, I claim as new and desire to secure by Letters Patent—

1. A weight-indicator, comprising a vibrating strip or ribbon having connection with a weight or pressure device, an electric circuit, an indicating device, and an interrupter in the electric circuit, whereby the undulating current will vibrate the ribbon or strip, and whereby such vibrations will be repeated at the indicating device, substantially as specified.

2. A weight-indicator, comprising a vibrating strip or ribbon attached to a scale-beam, an electromagnet adjacent to said strip or ribbon, a vibrating strip or ribbon attached at one end to a weighing-beam, an electromagnet adjacent to said strip or ribbon, an electric circuit in which said electromagnets are located, and an interrupter operated by one of the strips or ribbons, substantially as specified.

3. A weight-indicator, comprising a vibrating strip or ribbon having one end attached to a scale-beam, a vibrating strip or ribbon having one end attached to a weighing-beam, an electromagnet adjacent to each of said strips or ribbons, an electric circuit in which said electromagnets are located, a current-interrupter operated by the movements of the last-named strip or ribbon, and a sounding device operated by the first-named strip or ribbon when the two strips or ribbons are vibrating in unison, substantially as specified.

4. A weight-indicator, comprising a vibratory strip or ribbon connected at one end to a scale-beam, a vibratory strip or ribbon connected at one end to a weighing-beam, an electromagnet adjacent to each of the said strips or ribbons, an electric circuit in which said electromagnets are located, an interrupter for the circuit operated by one of the strips or ribbons, another electric circuit, and a call or alarm device in said other electric circuit, substantially as specified.

5. A weight-indicator, comprising a vibratory strip or ribbon connected at one end to a scale-beam and at the other end to a rocking hanger, another vibratory strip or ribbon connected at one end to a weighing-beam and at the other end to a rocking hanger, an electric circuit comprising electromagnets for operating the strips or ribbons, and an interrupter operated by the swinging of one of the hangers, substantially as specified.

6. The combination of two electric operating mechanisms for imparting vibratory motion, a source of electricity controlling them in unison, an appliance for periodically disturbing the action of said source of electricity, to influence the said electric operating mechanisms, two vibratory devices, each being under longitudinal tension, vibrating laterally, and controlled by one of said electric operating mechanisms, and means for adjusting the tension of the vibratory devices.

EDWARD McGARVEY.

Witnesses:
WILLIAM HARPER,
L. A. SCHAEFFER.